United States Patent
Frank et al.

(10) Patent No.: US 7,720,058 B2
(45) Date of Patent: May 18, 2010

(54) PROTOCOL ADAPTER FOR ELECTROMAGNETIC DEVICE ELEMENTS

(76) Inventors: Charles Frank, 62 Wheeler, Irvine, CA (US) 92620; Thomas Ludwig, 4800 Camino Costado, San Clemente, CA (US) 92673; Thomas Hanan, 27022 Manscal, Mission Viejo, CA (US) 92691; William Babbitt, 22350 Gavilan Rd., Perris, CA (US) 92570

( * ) Notice: Subject to any disclaimer, the term of this patent is extended or adjusted under 35 U.S.C. 154(b) by 1076 days.

(21) Appl. No.: 11/243,686

(22) Filed: Oct. 4, 2005

(65) Prior Publication Data
US 2006/0029070 A1    Feb. 9, 2006

Related U.S. Application Data

(62) Division of application No. 10/472,800, filed as application No. PCT/US02/40198 on Dec. 16, 2002, now Pat. No. 7,170,890.

(60) Provisional application No. 60/425,867, filed on Nov. 12, 2002.

(51) Int. Cl.
H04L 12/28 (2006.01)
(52) U.S. Cl. .................................................. 370/389
(58) Field of Classification Search ................. 370/389, 370/353, 354, 355, 386, 378, 392, 277, 349, 370/352, 471, 278, 225, 395.52; 386/46; 345/169; 714/749
See application file for complete search history.

(56) References Cited

U.S. PATENT DOCUMENTS

| 4,890,227 A | 12/1989 | Watanabe et al. |
| 5,129,088 A | 7/1992 | Auslander et al. |
| 5,193,171 A | 3/1993 | Shinmura et al. |

(Continued)

FOREIGN PATENT DOCUMENTS

CN    1359214    7/2002

(Continued)

OTHER PUBLICATIONS

Lin JC and Paul S, "Rmtp: a reliable multicast transport protocol," Proceedings of IEEE Infocom '96, vol. 3, pp. 1414-1424, 1996.

(Continued)

Primary Examiner—Chi H Pham
Assistant Examiner—Alexander Boakye
(74) Attorney, Agent, or Firm—Schwabe, Williamson & Wyatt, P.C.

(57) ABSTRACT

Cameras, radios, televisions, set top boxes, telephones, kitchen appliances, and other electrical devices have their own IP address, and communicate using an internetworking protocol. Of particular interest are those devices that utilize some form of mass storage. Communication of the packets between or among elements can occur using any suitable package switched network (or combination of networks), including the Internet. The preferred protocol for communicating packets is IP, and communication of the packets between elements can advantageously occur by virtualizing a native bus using IP. It is especially contemplated that the inventive elements can be disaggregated outside the housing of a device, at distances of several meters or more. Communication can be hard wired, or can include wireless aspects. Adapters are also contemplated that permit traditional elements to be addressed by their own IP addresses.

24 Claims, 4 Drawing Sheets

U.S. PATENT DOCUMENTS

| | | | |
|---|---|---|---|
| 5,506,969 A | 4/1996 | Wall et al. |
| 5,546,541 A | 8/1996 | Drew et al. |
| 5,590,124 A | 12/1996 | Robins |
| 5,590,276 A | 12/1996 | Andrews |
| 5,634,111 A | 5/1997 | Oeda et al. |
| 5,742,604 A | 4/1998 | Edsall et al. |
| 5,758,050 A | 5/1998 | Brady et al. |
| 5,758,188 A | 5/1998 | Appelbaum et al. |
| 5,867,686 A | 2/1999 | Conner et al. |
| 5,884,038 A | 3/1999 | Kapoor |
| 5,889,935 A | 3/1999 | Ofek et al. |
| 5,930,786 A | 7/1999 | Carino, Jr. et al. |
| 5,937,169 A | 8/1999 | Connery et al. |
| 5,949,977 A | 9/1999 | Hernandez |
| 5,991,891 A | 11/1999 | Hahn et al. |
| 6,018,779 A | 1/2000 | Blumenau |
| 6,081,879 A | 6/2000 | Arnott |
| 6,101,559 A | 8/2000 | Schultz et al. |
| 6,105,122 A | 8/2000 | Muller et al. |
| 6,128,664 A | 10/2000 | Yanagidate et al. |
| 6,157,935 A * | 12/2000 | Tran et al. ................. 715/202 |
| 6,157,955 A | 12/2000 | Narad et al. |
| 6,181,927 B1 | 1/2001 | Welling et al. |
| 6,202,060 B1 | 3/2001 | Tran |
| 6,246,683 B1 | 6/2001 | Connery et al. |
| 6,253,273 B1 | 6/2001 | Blumenau |
| 6,275,898 B1 | 8/2001 | Dekoning |
| 6,288,716 B1 | 9/2001 | Humpleman et al. |
| 6,295,584 B1 | 9/2001 | DeSota et al. |
| 6,330,236 B1 | 12/2001 | Ofek et al. |
| 6,330,615 B1 | 12/2001 | Gioquindo et al. |
| 6,377,990 B1 * | 4/2002 | Slemmer et al. ............ 709/225 |
| 6,385,638 B1 | 5/2002 | Baker-Harvey |
| 6,396,480 B1 | 5/2002 | Schindler et al. |
| 6,401,183 B1 | 6/2002 | Rafizadeh |
| 6,434,683 B1 | 8/2002 | West et al. |
| 6,449,607 B1 | 9/2002 | Tomita et al. |
| 6,466,571 B1 | 10/2002 | Dynarski et al. |
| 6,470,342 B1 | 10/2002 | Gondi et al. |
| 6,473,774 B1 | 10/2002 | Cellis et al. |
| 6,480,934 B1 | 11/2002 | Hino et al. |
| 6,487,555 B1 | 11/2002 | Bharat et al. |
| 6,549,983 B1 | 4/2003 | Han et al. |
| 6,567,863 B1 | 5/2003 | Lafuite et al. |
| 6,601,101 B1 | 7/2003 | Lee et al. |
| 6,601,135 B1 | 7/2003 | McBrearty et al. |
| 6,618,743 B1 | 9/2003 | Bennett |
| 6,629,264 B1 | 9/2003 | Sicola et al. |
| 6,681,244 B1 | 1/2004 | Cross et al. |
| 6,683,883 B1 | 1/2004 | Czeiger et al. |
| 6,693,912 B1 | 2/2004 | Wang |
| 6,701,431 B2 | 3/2004 | Subramanian et al. |
| 6,701,432 B1 | 3/2004 | Deng et al. |
| 6,710,786 B1 | 3/2004 | Jacobs et al. |
| 6,711,164 B1 | 3/2004 | Le et al. |
| 6,732,171 B2 | 5/2004 | Hayden |
| 6,732,230 B1 | 5/2004 | Johnson et al. |
| 6,741,554 B2 | 5/2004 | D'Amico et al. |
| 6,754,662 B1 | 6/2004 | Li |
| 6,757,845 B2 | 6/2004 | Bruce |
| 6,772,161 B2 | 8/2004 | Mahalingam et al. |
| 6,775,672 B2 | 8/2004 | Mahalingam et al. |
| 6,775,673 B2 | 8/2004 | Mahalingam et al. |
| 6,795,534 B2 | 9/2004 | Noguchi |
| 6,799,244 B2 | 9/2004 | Tanaka et al. |
| 6,799,255 B1 | 9/2004 | Blumenau et al. |
| 6,834,326 B1 | 12/2004 | Wang et al. |
| 6,853,382 B1 | 2/2005 | Van Dyke et al. |
| 6,854,021 B1 | 2/2005 | Schmidt et al. |
| 6,862,606 B1 | 3/2005 | Major et al. |
| 6,876,657 B1 | 4/2005 | Brewer et al. |
| 6,886,035 B2 | 4/2005 | Wolff |
| 6,894,976 B1 | 5/2005 | Banga et al. |
| 6,895,461 B1 | 5/2005 | Thompson |
| 6,895,511 B1 | 5/2005 | Borsato et al. |
| 6,901,497 B2 | 5/2005 | Tashiro et al. |
| 6,904,470 B1 | 6/2005 | Ofer et al. |
| 6,907,473 B2 | 6/2005 | Schmidt et al. |
| 6,912,622 B2 | 6/2005 | Miller |
| 6,917,616 B1 | 7/2005 | Normand et al. |
| 6,922,688 B1 | 7/2005 | Frey, Jr. |
| 6,928,473 B1 | 8/2005 | Sundaram et al. |
| 6,934,799 B2 | 8/2005 | Acharya et al. |
| 6,941,555 B2 | 9/2005 | Jacobs et al. |
| 6,947,430 B2 | 9/2005 | Bilic et al. |
| 6,985,956 B2 | 1/2006 | Luke et al. |
| 7,039,934 B2 | 5/2006 | Terakado et al. |
| 7,051,087 B1 | 5/2006 | Bahl et al. |
| 7,065,579 B2 | 6/2006 | Traversat et al. |
| 7,069,295 B2 | 6/2006 | Sutherland et al. |
| 7,072,823 B2 | 7/2006 | Athanas et al. |
| 7,072,986 B2 | 7/2006 | Kitamura et al. |
| 7,073,090 B2 | 7/2006 | Yanai et al. |
| 7,111,303 B2 | 9/2006 | Macchiano et al. |
| 7,120,666 B2 | 10/2006 | McCanne et al. |
| 7,145,866 B1 | 12/2006 | Ting et al. |
| 7,146,427 B2 | 12/2006 | Delaney et al. |
| 7,149,769 B2 | 12/2006 | Lubbers et al. |
| 7,152,069 B1 | 12/2006 | Santry et al. |
| 7,184,424 B2 | 2/2007 | Frank et al. |
| 7,188,194 B1 | 3/2007 | Kuik et al. |
| 7,200,641 B1 | 4/2007 | Throop |
| 7,203,730 B1 | 4/2007 | Meyer et al. |
| 7,206,805 B1 | 4/2007 | McLaughlin, Jr. |
| 7,225,243 B1 | 5/2007 | Wilson |
| 7,237,036 B2 | 6/2007 | Boucher et al. |
| 7,243,144 B2 | 7/2007 | Miyake |
| 7,254,620 B2 | 8/2007 | Iwamura et al. |
| 7,260,638 B2 | 8/2007 | Crosbie |
| 7,263,108 B2 | 8/2007 | Kizhepat |
| 7,278,142 B2 | 10/2007 | Bandhole et al. |
| 7,296,050 B2 | 11/2007 | Vicard |
| 7,333,451 B1 | 2/2008 | Khalil et al. |
| 7,353,266 B2 | 4/2008 | Bracewell et al. |
| 7,406,523 B1 | 7/2008 | Kruy et al. |
| 7,415,018 B2 | 8/2008 | Jones et al. |
| 7,428,584 B2 | 9/2008 | Yamamoto et al. |
| 7,436,789 B2 | 10/2008 | Caliskan et al. |
| 7,447,209 B2 | 11/2008 | Jeffay et al. |
| 7,463,582 B2 | 12/2008 | Kelly et al. |
| 7,526,577 B2 | 4/2009 | Pinkerton et al. |
| 2001/0020273 A1 | 9/2001 | Murakawa |
| 2001/0026550 A1 | 10/2001 | Koabayashi |
| 2001/0049739 A1 | 12/2001 | Wakayama et al. |
| 2002/0026558 A1 | 2/2002 | Reuter |
| 2002/0029286 A1 | 3/2002 | Gioquindo et al. |
| 2002/0039196 A1 | 4/2002 | Chiarabini |
| 2002/0052962 A1 | 5/2002 | Cherkasova et al. |
| 2002/0062387 A1 | 5/2002 | Yatziv |
| 2002/0065875 A1 | 5/2002 | Bracewell et al. |
| 2002/0087811 A1 | 7/2002 | Khare et al. |
| 2002/0091830 A1 | 7/2002 | Muramatsu |
| 2002/0126658 A1 | 9/2002 | Yamashita |
| 2002/0165978 A1 | 11/2002 | Chui |
| 2003/0018784 A1 | 1/2003 | Lette et al. |
| 2003/0023811 A1 | 1/2003 | Kim et al. |
| 2003/0026246 A1 | 2/2003 | Huang et al. |
| 2003/0065733 A1 | 4/2003 | Pecone |
| 2003/0069995 A1 | 4/2003 | Fayette |
| 2003/0081592 A1 | 5/2003 | Krishnarajah et al. |
| 2003/0118053 A1 | 6/2003 | Edsall et al. |
| 2003/0130986 A1 | 7/2003 | Tamer et al. |
| 2003/0161312 A1 | 8/2003 | Brown et al. |
| 2003/0172157 A1 | 9/2003 | Wright et al. |

| | | | |
|---|---|---|---|
| 2003/0182349 A1 | 9/2003 | Leong et al. | |
| 2003/0202510 A1 | 10/2003 | Witkowski et al. | |
| 2003/0204611 A1 | 10/2003 | McCosh et al. | |
| 2004/0025477 A1 | 2/2004 | Sichera et al. | |
| 2004/0047367 A1 | 3/2004 | Mammen | |
| 2004/0078465 A1 | 4/2004 | Coates et al. | |
| 2004/0100952 A1 | 5/2004 | Boucher et al. | |
| 2004/0181476 A1 | 9/2004 | Smith et al. | |
| 2004/0184455 A1 | 9/2004 | Lin | |
| 2005/0033740 A1 | 2/2005 | Cao et al. | |
| 2005/0058131 A1 | 3/2005 | Samuels et al. | |
| 2005/0102522 A1 | 5/2005 | Kanda | |
| 2005/0144199 A2 | 6/2005 | Hayden | |
| 2005/0166022 A1 | 7/2005 | Watanabe | |
| 2005/0175005 A1 | 8/2005 | Brown | |
| 2005/0198371 A1 | 9/2005 | Smith et al. | |
| 2005/0246401 A1 | 11/2005 | Edwards et al. | |
| 2005/0267929 A1 | 12/2005 | Kitamura | |
| 2005/0270856 A1 | 12/2005 | Earhart et al. | |
| 2005/0286517 A1 | 12/2005 | Babbar et al. | |
| 2006/0036602 A1 | 2/2006 | Unangst et al. | |
| 2006/0077902 A1 | 4/2006 | Kannan et al. | |
| 2006/0133365 A1 | 6/2006 | Manjunatha et al. | |
| 2006/0168345 A1 | 7/2006 | Siles et al. | |
| 2006/0176903 A1 | 8/2006 | Coulier | |
| 2007/0101023 A1 | 5/2007 | Chhabra et al. | |
| 2007/0110047 A1 | 5/2007 | Kim | |
| 2008/0181158 A1 | 7/2008 | Bouazizi et al. | |
| 2008/0279106 A1 | 11/2008 | Goodfellow et al. | |

FOREIGN PATENT DOCUMENTS

| | | |
|---|---|---|
| EP | 0485110 | 5/1992 |
| EP | 0654736 | 5/1995 |
| EP | 0700231 | 3/1996 |
| EP | 0706113 | 4/1996 |
| JP | 2001094987 | 4/2001 |
| JP | 2001359200 | 12/2001 |
| JP | 2002252880 | 9/2002 |
| JP | 2002318725 | 10/2002 |
| JP | 2005265914 | 9/2005 |
| WO | WO/01/01270 | 4/2001 |
| WO | WO02/15018 | 2/2002 |

OTHER PUBLICATIONS

B. Quinn et al. IP Multicast Applications: Challenges and Solutions. Sep. 2001. Network Working Group, RFC 3170.
Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.
International Search Report for Application No. PCT/US02/40205 dated May 27, 2004.
Ki-Il Kim et al., "Internet Multicast Provisioning Issues for Hierarchical Architecture", 2001, IEEE.
Lee et al. "A Comparison of Two Distributed Disk Systems" Digital Systems Research Center—Research Report SRC-155, Apr. 30, 1998, XP002368118.
Lee and Thekkath, "Petal: Distributed Virtual Disks", Systems Research Center.
PCT International Search Report for PCT App. No. PCTUS05/01542 dated Aug. 25, 2008.
Bruschi and Rosti, "Secure multicast in wireless networks of mobile hosts: protocols and issues", Mobile Networks and Applications, vol. 7, issue 6 (Dec. 2002), pp. 503-511.
"Computer Networking Essentials" Copyright 2001, Cisco Systems, Inc., 2001.
Satran et al. "Internet Small Computer Systems Interface (iSCSI)" IETF Standard, Internet Engineering Task Force, IETF, CH, Apr. 2004, XP015009500, ISSN: 000-0003.
Lee et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, Oct. 1, 1996, pp. 84-92, XP000681711, ISBN: 0-89791-767-7.
VMWare Workstations User's Manual, Version 3.2, VMWare, Inc., Copyright 1998-2002.
"Limited distributed DASD Checksum, a RAID Hybrid" IBM Technical Disclosure Bulletin, vol. 35, No. 4a, Sep. 1992, pp. 404-405, XP000314813 Armonk, NY, USA.
Kim et al., "Internet multicast provisioning issues for hierarchical architecture", Networks, 2001, Proceedings, Ninth IEEE International Conference, published Oct. 12, 2001, pp. 401-404.
Satran et al., iSCSI, Internet Draft draft-ietf-ips-iscsi-19.txt.
Chavez, A Multi-Agent System for Distributed Resource Allocation, MIT Media Lab, XP-002092534.
Non-Final Office Action dated Jun. 12, 2006 for U.S. Appl. No. 10/472,800.
Non-Final Office Action dated Jun. 16, 2006 for U.S. Appl. No. 11/243,573.
Non-Final Office Action dated Mar. 21, 2006 for U.S. Appl. No. 11/243,573.
Non-Final OA dated Dec. 27, 2007 for U.S. Appl. No. 11/399,110.
Non-Final OA dated Aug. 4, 2008 for U.S. Appl. No. 11/399,110.
Notice of Allowance dated Jan. 27, 2009 for U.S. Appl. No. 11/399,110.
Notice of Allowance dated May 15, 2009 for U.S. Appl. No. 11/399,110.
Non-Final Office Action dated Apr. 14, 2009 for U.S. Appl. No. 10/473,509.
Non-Final Office Action dated Jan. 25, 2008 for U.S. Appl. No. 10/473,509.
Non-Final Office Action dated Jul. 25, 2007 for U.S. Appl. No. 10/473,509.
Non-Final Office Action dated Apr. 2, 2009 for U.S. Appl. No. 11/243,137.
Final OA dated Nov. 10, 2008 for U.S. Appl. No. 11/243,137.
Non-Final Office Action dated Mar. 27, 2008 for U.S. Appl. No. 11/243,137.
Non-Final OA dated Feb. 6, 2008 for U.S. Appl. No. 11/243,143.
Final OA dated Nov. 13, 2008 for U.S. Appl. No. 11/243,143.
Final OA dated Feb. 4, 2009 for U.S. Appl. No. 11/243,143.
Non-Final OA dated Aug. 18, 2008 for U.S. Appl. No. 11/243,143.
Non-Final OA dated Jan. 10, 2008 for U.S. Appl. No. 11/479,711.
Final OA dated Jul. 11, 2007 for U.S. Appl. No. 11/479,711.
Non-Final OA dated Oct. 2, 2008 for U.S. Appl. No. 11/479,711.
Final OA dated Apr. 1, 2009 for U.S. Appl. No. 11/479,711.
Advisory Action dated Jun. 25, 2009 for U.S. Appl. No. 11/479,711.
Garth A. Gibson, et al., File Server Scaling with Network-Attached Secure Disks; Joint International Conference on Measurement and Modeling of Computer Systems Proceedings of the 1997 ACM Sigmetrics international conference on Measurement and modeling of computer systems; pp. 272-284; 1997.
WebTen User's Guide; Version 3.0, Jan. 2000; http://www.tenon.com/products/webten/ WebTenUserGuide/1_Introduction.html.
Virtual Web mini-HOWTO; Jun. 6, 2001; Parag Mehta; www.faqs.or/docs/Linux-mini/Virtual-Web.html.
Chad Robinson, The Guide to Virtual Services, Linux Journal, vol. 1997 Issue 35, Mar. 1997.
Micah Beck et al., An End-to-End Approach for Globally Scalable Network Storage, ACM Sigcomm Computer Communication Review, vol. 32, Issue 4 (Oct. 2002), Proceedings of the 2002 Sigcomm conference; pp. 339-346, 2002.
Garth A. Gibson et al., A Cost Effective High-Bandwidth Storage Architecture;ACM Sigops Operating Systems Review, vol. 32, Issue 5, pp. 92-103, 1998.
WebTen User's Guide; Version 7.0, Mar. 2008; http://www.tenon.com/products/webten/ WebTenUserGuide/8_VirtualHosts.html, Chapter 8.

* cited by examiner

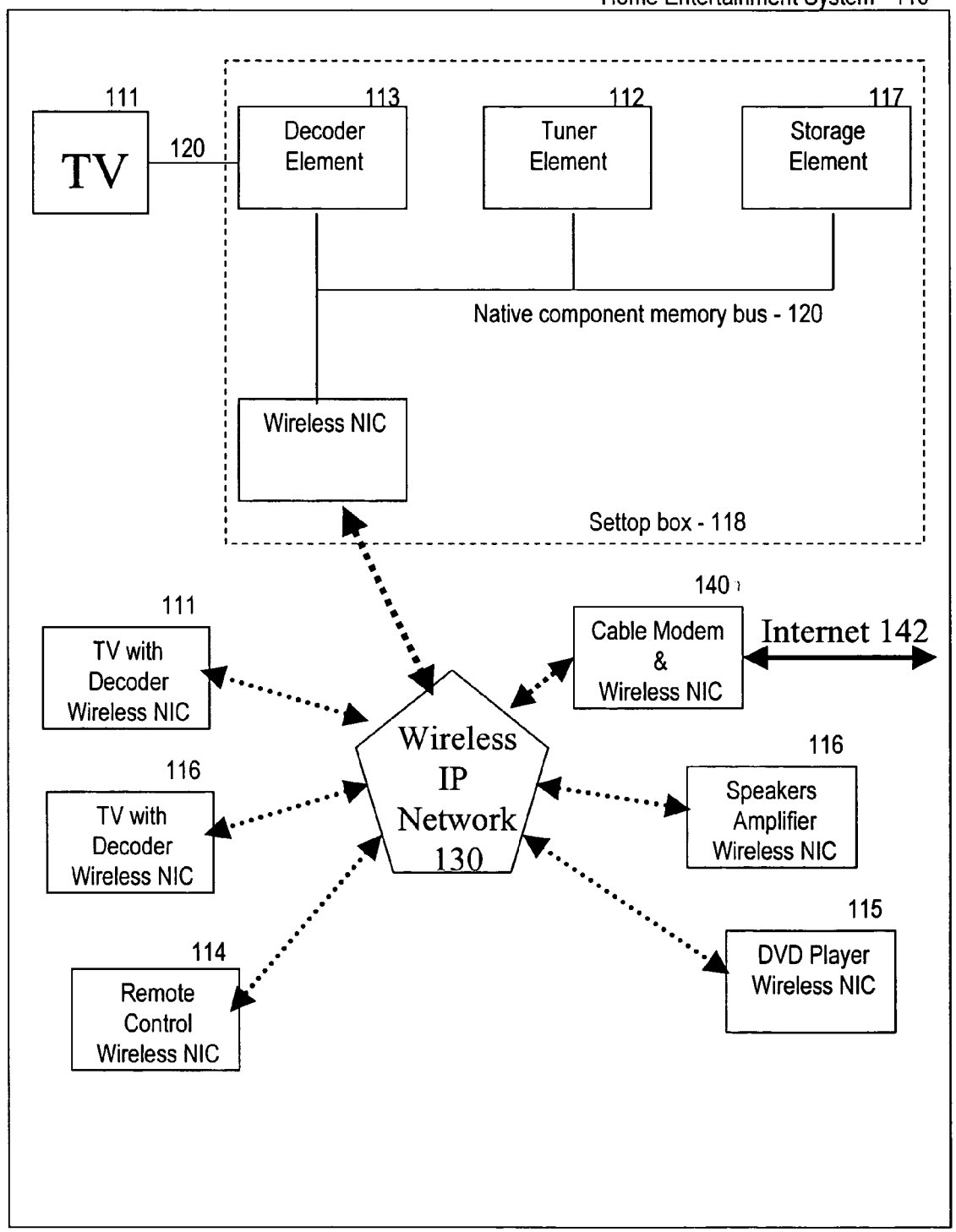

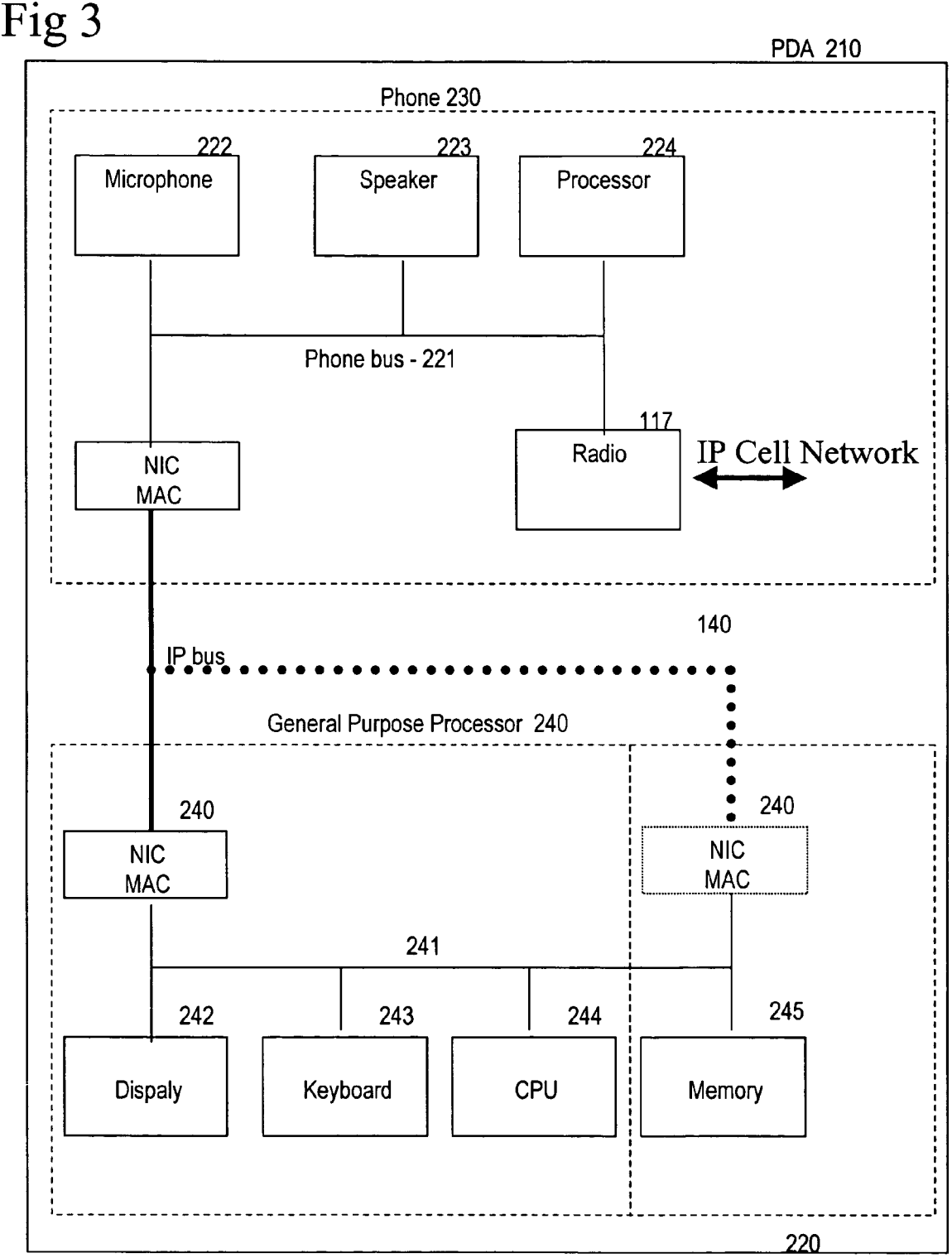

PROTOCOL ADAPTER FOR ELECTROMAGNETIC DEVICE ELEMENTS

This application is a divisional of U.S. Ser. No. 10/472,800, filed Mar. 25, 2004 now U.S. Pat. No. 7,170,890 which is the national stage of international application number PCT/US02/40198 filed on Dec. 16, 2002; which claims priority to provisional application No. 60/425,867 filed on Nov. 12, 2002.

FIELD OF THE INVENTION

The field of the invention is electrical devices having human interfaces, including especially cameras, radios, televisions, telephones, kitchen appliances, and the like.

BACKGROUND OF THE INVENTION

Audio systems have long included individual components in separate housings. Since at least the 1950s, for example, a component stereo system might well include a tuner, amplifier, tape deck, and some sort of rotating media player. Sophisticated video systems have also long been "componentized", so that a component video system might include a television linked with a VCR or DVD player, and a personal video camera or PVR.

Whether analog or digital, communication between such components has traditionally (i.e. prior to this invention) comprised a raw point-to-point data stream. A speaker, for example, merely accepts an analog signal from an amplifier. The information is assumed to be reliable, and there is no error checking, resending of information or the like. Even a DVD player sends raw data on an extension of its native bus.

Raw data transfer only works well when rigid standards are in place, the components are physically close together, and there are relatively few components being connected. Among other limitations, components that communicate using raw data transfer are only compatible if they are designed to talk with each other. Thus, a traditional video camera has to be designed to export a standard video or other signal that could be understood by a television. Similarly, older personal computers were always designed to export data to a printer using a RS-232 standard (serial port), or a Centronics standard (parallel port), because those are the communications standards that printers could understand.

The current trend is to communicate among components (also referred to as devices herein) using packets of information. In addition to the data being transferred, packets include header information such as type of data contained in the packet, i.e. HTML, voice, ASCII, etc., and origination and destination node information. The header information permits error checking, and routing across package switched networks such as the Internet between devices that may be widely spaced apart. The header information also allows extremely disparate devices to communicate with each other—such as a clock radio to communicate with a computer. Recently published U.S. patent application Ser. No. 20020031086, (Welin, Mar. 14, 2002) refers to linking "computers, IP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus."

Interestingly, the idea of packet interconnectivity has never previously been applied to the level of elements within a device. All of the packet addressing in prior art devices has been performed between or among devices, as opposed to between or among elements within a given device.

Indeed, as used herein, the term "element" refers to a hardware unit that is a functional portion of a device, and traditionally communicates with other units of the same device across a bus, without having its own IP address. Where elements of a device communicate digitally, they have typically, but not necessarily, been located in a common housing, under the control of an operating system. In a traditional component video camera 10 of FIG. 1A, for example, a human interface 11, tuner 12, storage 13 (memory), and video decoder 14 all communicate across a memory bus 15, and are all contained within a common housing 16. The tuner uses data streaming or data blocks to talk to the storage, not packets. Similarly, in a traditional telephone enabled handheld computer (PDA), not shown, a telephone chip communicates with a memory chip and a CPU across a memory bus. The telephone chip uses data streaming or data blocks rather than packets to talk with the CPU.

Historically, it has made sense to use of data streaming or data blocks across a native bus to interconnect elements within the same component. Elements sharing the same physical box of a device are already designed to work together, they are physically close, and there are relatively few of them. Reliability across the bus is assumed, and speed is usually of paramount concern. Each of the elements can readily monitor the bus, and pull off whatever data it needs. There is no need to burden the device with packetizing the data to address individual ones of the elements with distinct, element-specific addresses.

In the past, elements within different devices have been able to talk with each other using packets, but only indirectly because the elements did not have their own IP addresses. For example, it is already known for an originating element (such as a disk drive) in a first device to use a native bus to send a data stream or series of data blocks to an IP packeting element in the same device, which packetizes the communication for transmission to a second device. But in such instances the second device must translate the packet back into a data stream of series of data blocks, and then send the information along its native bus to the receiving element (which may be another disk drive, display screen, or whatever). The packets are always directed to and from the devices. The originating and receiving elements never directly address each other using addresses in the packets.

A significant drawback of the prior art technology is that communication between elements that does use packets always goes through some sort of operating system. For relatively inexpensive devices, the cost of an operating system can be very significant, and in some instances prohibitive. These limitations hold true for the entire generation of "Internet ready" or "Web-enabled" appliances. In those devices, the prior art solution is to have the appliance send packets of information to a computer, which then stores or otherwise operates upon the information. This requires an operating system on some computer, either a local computer or a computer far away on the Internet. See, for example, Scenix' SX-Stack, described in "Scenix Debuts TCP/IP Embedded Chip For Internet Connectivity", Computer Protocols, vol. 12, no. 11 (Nov. 1, 1999); Zilog's eZ80, described in "Zilog Sees New Lease of Life For Z80 In Internet Appliances", Computergram International, No. 3751 (Sep. 21, 1999); and "Providing Network Connectivity For Small Appliances: A Functionally Minimized Embedded Web Server", IEEE Commun. Mag., Vol. 39, No. 10 (October 2001).

Another result of the prior art technology is limited flexibility in choosing elements for inclusion in devices. The video camera of FIG. 1A is limited to the storage element(s) intended by the designers to be used with that camera. If a camera is designed to work with a flash card, the user cannot start using a re-writable CD ROM with his camera. Similarly, a television set top box is limited to the disk drives that are supported by its bus and operating system.

Still another result of the prior art technology is limited flexibility in disaggregating elements of a device. In the video camera example of FIG. 1A, the storage element is contained within the camera itself (although the storage medium may be removable) because the storage element is connected directly to the native bus. If a user wants to increase the storage, he either has to purchase a bigger memory card, or connect his camera to the bus of a computer. The camera cannot directly utilize storage that may be elsewhere in the room. In the case of television set top box, the tuner or cable decoder elements need to be in close proximity to the television.

Thus, there is a need for improved apparatus, systems, methods and protocols by which elements of electrical devices communicate with each other.

SUMMARY OF THE INVENTION

The inventive subject matter provides elements that have their own IP address, and that communicate using packets of information addressed using those IP addresses. Individual elements can be included in a common housing with other elements, or can be employed in a disaggregated manner as part of a virtual device.

Contemplated devices include virtually all apparatus that communicate electronically with the outside world in the novel manner. This includes digital and still cameras, radios, televisions, set top boxes, telephones, and kitchen appliances, as well as computers and personal digital assistants. Of particular interest are those devices that utilize some form of mass storage, and those having a human interface such as a keyboard, display screen, audio input or output, or combinations of same.

Communication of the packets between or among elements can occur using any suitable package switched network (or combination of networks), including the Internet. The preferred protocol for communicating packets is IP, and communication of the packets between elements can advantageously occur by virtualizing a native bus using IP.

It is especially contemplated that the inventive elements can be disaggregated outside the housing of a device, at distances of several meters or more. Communication can be hard wired, or can include wireless aspects.

The addressing of elements can be done indirectly through a proxy server, although the concept is still that each of the inventive elements would have its own distinct address. In contemplated embodiments, the inventive elements can advantageously communicate with each other using a peer-to-peer protocol, and in some instances without the need for an operating system.

Still other aspects of the inventive subject matter are apparatus, systems, methods and protocols by which elements of electrical devices communicate with each other using packets of information addressed to individual ones of the elements. For example, an adapter can include a functionality (hardware, software, or some combination of the two) that allows an element to execute an internetworking protocol, and be addressed by its own IP address. Such adapters are contemplated to permit traditional elements to be addressed by their own IP addresses.

Various objects, features, aspects and advantages of the inventive subject matter will become more apparent from the following detailed description of preferred, along with the accompanying drawings in which like numerals represent like components.

BRIEF DESCRIPTION OF THE DRAWINGS

FIG. 2 is a schematic of a home entertainment system in which the elements shown are coupled by a wireless virtual bus using IP.

FIG. 3 is a schematic of a personal digital assistant having a telephone, in which the elements shown are coupled by a wireless virtual bus using IP.

DETAILED DESCRIPTION

Figure 1A:
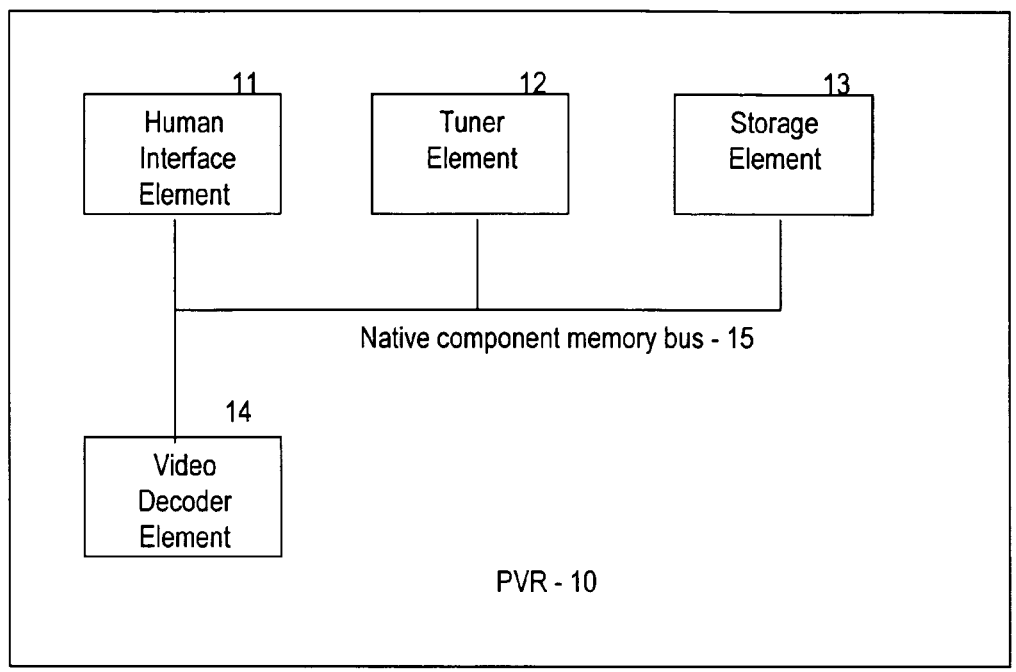
FIG. 1A is a schematic of a traditional component personal video recorder in which the elements shown are coupled by a memory bus.
Figure 1B:
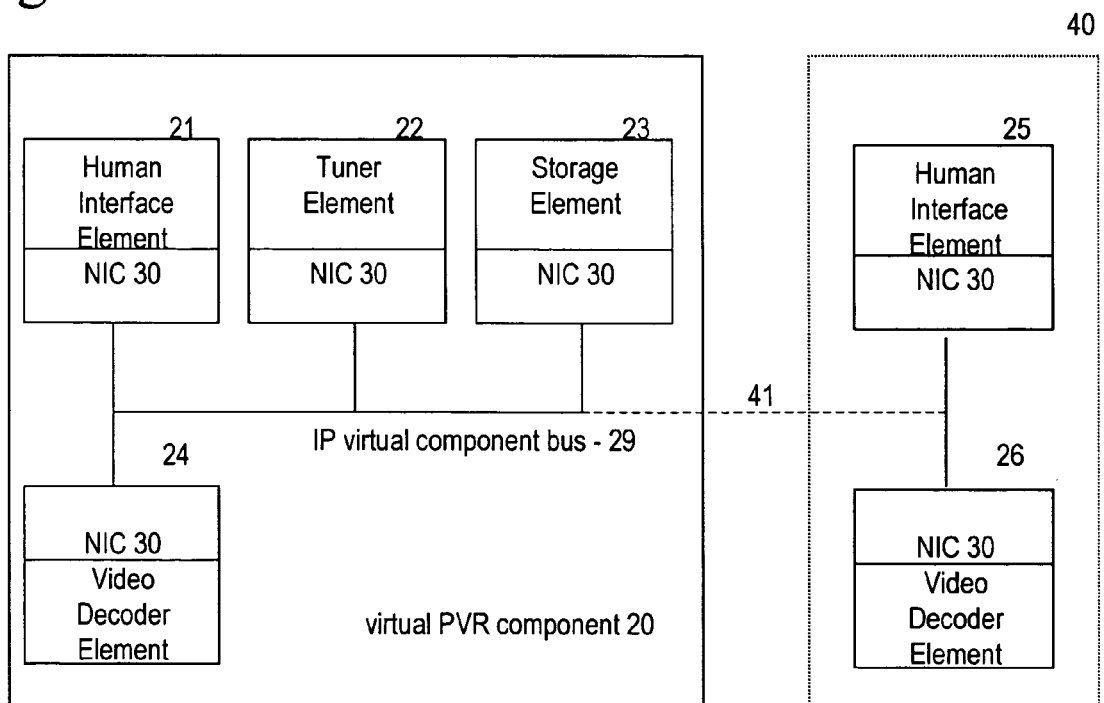
FIG. 1B is a schematic of a virtual component personal video recorder in which the elements shown are coupled by a native bus virtualized using IP.

In FIG. 1B a virtual component personal video recorder 20 is an electrical device (which term is used herein to include electronic devices) that generally includes a human interface 21, a tuner element 22, a storage element 23, and a video decoder element 24, all connected by IP across a network or virtualized native bus 29.

In this configuration, the tuner element 22, for example, would send information to the storage element 23 using packets having a header that contains the IP address of the storage element 23. Similarly, the storage element 23 would send information back to the tuner element 22 using packets having a header that contains the IP address of the tuner element 22.

It should be appreciated that each of the various elements 21-24 would need to have sufficient functionality to communicate using IP. That functionality could be designed into the elements, or added on to existing elements using an IP adapter 30. Indeed, the adapter in such circumstances would essentially be a simple block-to-packet and packet-to-block translator.

It should also be appreciated that the operative principles herein can operate across a network acting as a virtual bus, or a wide variety of physical buses and protocols. Examples are ATA, ATAPI, SCSI, Fiber CH, PCMCIA, CardBus, and USB. The term IP is used herein generically with reference to any internetworking protocol that handles packets.

Disaggregated Devices

Each of the elements can have any suitable physical form. For example, the storage element 23 can correspond to a RAM or ROM chip or chip bank, a rotating memory, a sequential tape type memory, and so on.

Use of IP to interconnect the various elements means that they can be located together in the same housing (not shown), or geographically disaggregated as shown by dotted line 40. Indeed, the storage element 23 could be stationary on a desktop, while the remaining elements are all contained within a common housing that is carried about. Elimination of the housing restriction also means any number of additional elements can be incorporated. In FIG. 1B the PVR 20 can optionally include a second human interface 25 (such as a television display), and a corresponding second video decoder 26. Indeed, these optional elements 25, 26 might only be included from time to time, and might themselves be located in another housing or disaggregatred as depicted by dotted lines 41.

Viewed from another aspect, use of IP to interconnect the various elements means that a given device can be readily shared by many other disaggregated elements. Thus, multiple PVRs, a television, and a computer could all share the same disk drive.

An interesting aspect of the personal video recorder 20 is that the various elements can communicate as peers on a peer-to-peer network. This can completely eliminate dependence on any particular operating system, and can eliminate operating systems altogether. In addition, many of the elements attached to the network will be dependent on other elements attached to the network to perform tasks that are not within their individual capacities, and will be able to discover, reserve, and release the resources of other peers needed to perform such tasks. Peers will preferably be able to discover the other elements attached to the network, the characteristics of the other elements attached to the network, and possibly the contents of at least some of the elements attached to the network. Such discovery is accomplished without the assistance of a master device, and will preferably involve direct communication between the peer elements.

Preferred networks will be masterless in that all elements have equal access to the network and the other elements attached to the network. The peer elements of the network will preferably communicate with each other utilizing low-level protocols such as those that would equate to those of the transport and lower layers of the OSI model. Preferred embodiments will utilize IP and UDP protocols for communication between elements.

Storage Element

It is contemplated the storage space available on preferred storage elements will be logically or physically divided into smaller storage spaces that will be referred to herein as partitions. Such partitions preferably comprise a plurality of storage locations (i.e. blocks), and each has associated with it a unique identifier that may be referred to as a logical block address (LBA). If a storage element comprises a hard disk such as is in common use in personal computers, the partitions, blocks, and LBAs of the storage element may be equivalent to partitions, blocks, and LBAs of the hard disk. Alternatively, the partitions, blocks, and LBAs may simply be a model by which other elements may interact with a storage element.

There are two features of preferred storage elements that are contemplated as being particularly advantageous. One such feature is that the storage elements comprise a plurality of network addresses such that network traffic addressed with any of such addresses will be received by the corresponding storage element (or storage elements). The second such feature is that each partition of the storage element is associated with one unique network address. As an example, a storage element attached to an IP network could be assigned a plurality of IP addresses with one IP address being dedicated to and associated with each partition of the storage element.

It is contemplated that utilizing network addresses to both route packets between network elements and within at least one such element facilitates the use of very light protocols for communication between elements. More particularly, in a packet based network having storage units divided into partitions attached to it, mapping network addresses to partitions of the storage elements is contemplated to simplify communications by allowing the network address to identify both the element on the network that a network packet is to be sent to, and the partition that the contents of the packet are intended to affect. Thus, in an IP network where IP addresses are the network addresses, the storage element and partition may be directly addressed at the IP level of TCP/IP or UDP/IP stack.

Preferably, storage elements are able to dynamically create partitions upon receipt of requests from network elements, and the network addresses for such partitions are obtained from an address server such as a DHCP server upon request from the storage element. Assignment of IP addresses to partitions will preferably also occur during initialization of the storage element such as when the storage element is first turned on. When a network element requests use of a storage element, the network element will preferably provide a unique identifier, possibly a name, to the storage element, and the storage element will in turn associate the identifier with any newly created partition.

It is important to note that address allocation devices such as DHCP servers are not masters, since they don't control the network, elements coupled to the network, or the sharing of resources between elements.

Since a particular storage element may comprise multiple partitions but only a single network interface card (NIC), it is preferred that storage elements be able to obtain multiple network addresses despite having a single NIC and a single media access control (MAC) address. This can be accomplished by providing a unique partition identifier to an address server when trying to obtain a network address from the address server. It is contemplated that associating a name provided by an element with any partition created for that element makes it possible to identify each of the partitions of an storage element despite the fact that network address associated with each partition may have changed since the partition was created.

A network element will request a particular size portion of the overall storage of a storage element, and it is contemplated that in some networks, a particular network element may be able to request that a storage element make all of its storage available to that element.

Communications

In preferred embodiments, communications between elements, particularly communications between a storage element and a non-storage element, will utilize a datagram protocol in which data blocks are atomically mapped to a target device. A datagram sent between elements will preferably comprise command (CMD), logical block address (LBA), data, and token fields, and no more than X additional bytes where X is one of 1, 2, 5, 10, 15, and 30. The data field of such a datagram is preferably sized to be the same as the block size (if applicable) of the element to which the datagram is addressed. As such, an element sending a quantity of data to a storage element where the quantity of data is larger than the block size of the storage element will typically divide the quantity of data into blocks having the same size as the blocks of the storage element, assign LBAs to the blocks, and send each block and LBA pair to the storage element in a datagram.

It is preferred that the datagrams be communicated between elements encapsulating them within addressed packets such as IP packets, and the network address of the encapsulating packet be used to identify both the element a packet is intended to be sent to, and the partition within the element that the datagram pertains to.

It is preferred that datagram recipients handle datagrams on a first come, first served basis, without reordering packets, and without assembling the contents of the data fields of datagrams into a larger unit of data prior to executing a command identified in the CMD field. As an example, an storage element may receive a datagram containing a block of data, an LBA, and a write command. The storage element, without having to wait for any additional packets, utilizes the network address of the packet enclosing the datagram to identify the partition to be used, and utilizes the LBA to identify the location within the partition at which the data in the data field is to be written.

Handling the data in individual datagrams as they arrive rather than reassembling the data permits the use of an implied ACK for each command. Using an implied rather than an explicit ACK results in a substantial increase in performance.

In FIG. 2, a home entertainment system 110 generally includes a television 111, a tuner 112, a decoder 113, a video player 114, a DVD player 115, speakers 116, and a random access storage device 117, each of which can be addressed using its own IP address. In this instance some of the various elements are connected by hard wiring 120, while others are connected using a wireless virtual bus 130 using IP. Also shown is a cable modem connection 140 to the Internet 142. The Internet 142 is employed herein merely as an example of a public package switched network, and those skilled in the art will recognize that the same principles apply to local area networks and other private and public package switched networks.

In the particular example of FIG. 2, the tuner 112, decoder 113, and random access storage device 117 are all housed in a common cabinet of a set top box designated by dotted line 118. In alternative embodiments these elements could be disaggregated. Similarly, any of the elements (as well as others not shown) could be aggregated into one or more common housings.

Of particular advantage is that the various elements of home entertainment system 110 can be located in different rooms. Thus, the television 111, tuner 112, decoder 113, video player 114, and amplifier/speaker 116 could all be located in a family room (not shown), while the DVD player 115 and random access storage device 117 could be included in a computer (not shown) located in a bedroom. But since each of the elements can communicate via their own IP addresses, it is irrelevant to each element where the other elements are located. Indeed, the television 111 could just as easily access information stored on a mass storage in a friend's house across town, or in another country. Additional details can be found in concurrently filed application Ser. Nos. 10/473,509 and 10/473,713, the disclosures of which are incorporated herein by reference.

Any of the elements of home entertainment system 110 can be used independently, or in combination with, any of the other elements. For example, a radio is really a combination of the tuner 112 and the amplifier/speaker 116 working together. Tuning and volume controls can be located on those particular elements, or can be located on a standard remote control (not shown) that interfaces with those elements in a traditional manner. Tuning and volume controls could even be located on a web-enabled PDA, since the PDA could then communicate with the tuner 112 and the amplifier/speaker 116 over a LAN, WAN, or other package switched network.

Since physical proximity is not essential, the home entertainment system 110 might also include other elements on an occasional basis, such as the PVR camera of FIG. 1B and the telephone portion in the PDA of FIG. 3. That way a user could talk over the telephone, viewing the person at the other end on the television 111, and capturing his own image on the PVR 20. The conversation could even be stored on the storage element 23, which might be in another room, or thousands of miles away. This is all facilitated by the various elements having their own IP addresses, and communicating using IP protocol, which is not limited by point-to-point connections.

It is contemplated that once persons in the industry recognize the benefits of elements that use their own IP address to execute packet communication with other elements, companies will start producing and/or marketing such elements. It is also contemplated that companies will start producing and/or marketing adapters that includes a functionality (hardware or software, or come combination of the two) to permit traditional elements to operate in the manner of the IP enabled elements.

Thus, methods falling within the inventive subject matter include manufacturing or selling an element that can utilize its own IP address to execute packet communication with other elements. Other inventive methods include manufacturing or selling adapters that enable prior art type elements to use their own IP address to execute packet communication with other elements. Indeed it is contemplated that companies will recognize that such adapters are available, and will continue to manufacture or sell prior art type elements, knowing (or even advertising) that users can employ such adapter to enable such prior art type elements to use their own IP address to execute packet communication with other elements.

In FIG. 3 a personal digital assistant 210 has a housing 220 that contains a telephone portion 230 and a general purpose CPU portion 240, connected on PDA bus 250. The telephone and CPU portions 220, 230 have their own IP addresses. They communicate with the outside world, and can communicate with each other across PDA bus 250 using IP.

Telephone portion 220 has its own bus 221 that connects a microphone 222, a speaker 223, and a processor 224. Notwithstanding the existence of the telephone bus 220, the telephone portion 220 is still considered to be an element as that term is employed herein because of atomicity. The microphone 222, speaker 223, and processor 224 do not have their own IP addresses and are not addressed using IP, and the telephone portion 220 is thus the smallest unit that has its own IP address and is addressed using IP.

The general purpose CPU portion 240 has its own bus 241 that connects display 242, keyboard 243, CPU 244, and memory portion 245. If the memory portion 245 has its own IP address and is addressed using IP, then the memory portion 245 is considered an element. If not, then the principle of atomicity provides that the entire general purpose CPU portion 240 is considered an element.

Figure 4:
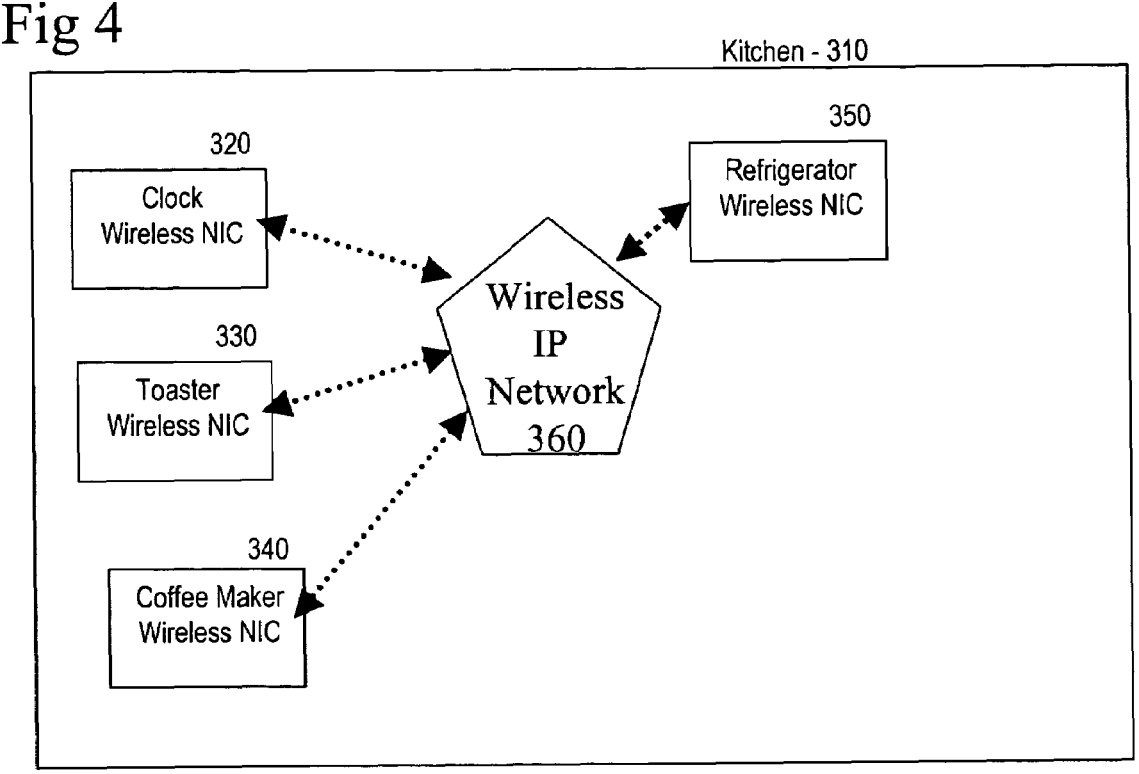
FIG. 4 is a schematic of a kitchen having a clock, a toaster, a coffee maker, and a toaster, all having their own IP addresses and all coupled by a wireless virtual bus using IP.

In FIG. 4, a kitchen 310 has multiple appliances, namely a clock 320, a toaster 330, a coffee maker 340, and a refrigerator 350, all of which are coupled by a wireless virtual bus 360.

These appliances can talk to one another using IP without control by any external computer. Thus, the toaster 330 and coffee maker 340 may receive time signals from the clock 320, and use those signal to determine when to begin operation in the morning. This type of interconnectivity would avoid having to reset onboard clocks whenever the power to these appliances is interrupted, or the time changes according to daylight savings time.

It is important to note that the various elements 320, 330, 340, 350 are not hard-wired at all using any real bus. As a result, they can be interchanged or upgraded, moved or removed as desired. The clock 320, for example, could be just as easily be located in the kitchen 310 as in a bedroom (not shown) or the bureau of standards in Washington (not shown).

The various elements 320, 330, 340 can also be combined with any other elements, anywhere else that is reachable by IP. For example, if the household is to be shut down for an extended period of time, the PDA of FIG. 3 could be used to send a signal to the refrigerator 350 to reduce the temperature by a few degrees.

Thus, specific embodiments and applications of the inventive electrical devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus comprising:
 a first interface configured to receive a first packet, transmitted to the apparatus from an adapter associated with a first element of an electrical device over a bus, the first packet including a first Internet Protocol (IP) address that is uniquely associated with a first storage area of a second element of the electrical device;
 a second interface configured to be coupled to the second element; and
 a translator coupled with the first interface and the second interface and configured to receive the first packet from the first interface and to issue a command to the second element through the second interface based at least in part on the first packet, the translator further configured to receive a second packet from the first interface, the second packet including a second IP address that identifies a second storage area of the second element.

2. The apparatus of claim 1, wherein the apparatus, the first element, and the second element are disposed within a common housing.

3. The apparatus of claim 2, wherein the first interface is a wired interface and the bus comprises a native bus of the electrical device.

4. The apparatus of claim 2, wherein characteristics of the second element are discoverable by a third element that is external to the common housing by use of a query that includes the first IP address.

5. The apparatus of claim 1, wherein the second element comprises a disk drive.

6. The apparatus of claim 5, wherein the first storage area comprises a partition of a storage medium of the disk drive.

7. The apparatus of claim 1, wherein the first element comprises a processor.

8. The apparatus of claim 1, wherein the first interface is a wireless interface and the bus comprises a virtual component bus.

9. An electrical device comprising
 a bus;
 first and second elements;
 first and second adapters respectively coupled to the first and second elements and further coupled to the bus,
  the first adapter configured to receive, from the second adapter over the bus, a first packet including first Internet Protocol (IP) address that is uniquely associated with the first element, and to issue a first command to the first element based at least in part on the first packet,
  the second adapter configured to receive a second packet, from a third element over the bus, the second packet having a second IP address that is uniquely associated with the second element and to issue a second command to the second element based at least in part on the second packet; and
 a housing to house the first and second elements, the first and second adapters, and the bus.

10. The electrical device of claim 9, wherein characteristics of the first element are discoverable by a fourth element that is external to the housing by use of a query that includes the first IP address.

11. The electrical device of claim 9, wherein the first element comprises a disk drive.

12. The electrical device of claim 11, wherein the first IP address identifies a partition of a storage medium of the disk drive.

13. The electrical device of claim 12, wherein the partition is a first partition and the first adapter is further configured to receive a third packet, the third packet including a third IP address that identifies a second partition.

14. The electrical device of claim 11, wherein the first element comprises a processor.

15. A method comprising:
 receiving, at a first adapter associated with a first element of an electrical device, a first packet transmitted to the first adapter from a second adapter associated with a second element of the electrical device over a bus, the first packet including a first Internet Protocol (IP) address that is uniquely associated with a first storage area of the first element;
 receiving, at the first adapter, a second packet including a second IP address that identifies a second storage area of the first element;
 translating the first packet by the first adapter; and
 issuing a first command to the first element based at least in part on the first packet;
 translating the second packet by the first adapter; and
 issuing a second command to the first element based at least in part on the second packet.

16. The method of claim 15, wherein said receiving the first packet comprises receiving the first packet via a wired interface.

17. The method of claim 16, wherein the first element comprises a disk drive.

18. The method of claim 17, wherein the first IP address identifies a partition of a storage medium of the disk drive.

19. The method of claim 18, wherein the partition is a first partition and the method further comprises:
 receiving a third packet over the bus, the third packet including a third IP address that identifies a second partition.

20. The method of claim 17, wherein the second element comprises a processor.

21. A method comprising:
 receiving a first packet from a first interface of an apparatus, transmitted to the apparatus from an adapter associated with a first element of an electrical device over a bus, the first packet including a first Internet Protocol (IP) address that is uniquely associated with a first storage area of a second element of the electrical device; and
 receiving a second packet from the first interface, the second packet including a second IP address that identifies a second storage area of the second element;

generating and issuing, through a second interface of the apparatus, first and second commands to the second element based at least in part on the first and second packets; and accessing the first and second storage areas of the second element based on the first and second commands, respectively.

22. The method of claim 21, wherein the apparatus, the first element, and the second element are disposed within a common housing.

23. A method comprising:

receiving, from an adapter over a bus, a first packet including a first Internet Protocol (IP) address that is uniquely associated with a first element, wherein the first element, a second element associated with the adapter, and the bus are disposed in a common housing;

issuing a command to the first element based at least in part on the first packet;

receiving a second packet, from a third element over the bus, the second packet having a second IP address that is uniquely associated with the second element; and issuing a second command to the second element based at least in part on the second packet.

24. The method of claim 23, further comprising:

responding to a query including the first IP address with characteristics of the first element, the query being from a third element that is external to the common housing.

* * * * *